United States Patent
Upton

(10) Patent No.: US 7,251,395 B2
(45) Date of Patent: Jul. 31, 2007

(54) SYSTEMS AND METHODS FOR A CONTINUOUSLY VARIABLE OPTICAL DELAY LINE

(75) Inventor: Eric L. Upton, Bellevue, WA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/357,666

(22) Filed: Feb. 17, 2006

(65) Prior Publication Data

US 2006/0140564 A1 Jun. 29, 2006

Related U.S. Application Data

(62) Division of application No. 10/636,007, filed on Aug. 7, 2003, now Pat. No. 7,003,204.

(51) Int. Cl.
*G02B 6/02* (2006.01)
(52) U.S. Cl. .............................. 385/32; 385/27; 385/16
(58) Field of Classification Search ................ 385/32, 385/27, 16
See application file for complete search history.

(56) References Cited

U.S. PATENT DOCUMENTS

| | | | | |
|---|---|---|---|---|
| 4,738,527 | A | * 4/1988 | McBrien | ..................... 356/5.05 |
| 5,075,545 | A | * 12/1991 | McBrien | ................. 250/227.21 |
| 5,204,921 | A | 4/1993 | Kanei et al. | |
| 5,698,848 | A | * 12/1997 | Belk | ..................... 250/227.11 |
| 5,822,274 | A | 10/1998 | Haynie et al. | |
| 6,785,004 | B2 | 8/2004 | Kersey et al. | |
| 2002/0097761 | A1 | * 7/2002 | Sucha et al. | .................. 372/30 |
| 2003/0142939 | A1 | 7/2003 | Gorni et al. | |
| 2004/0037505 | A1 | * 2/2004 | Morin | ......................... 385/37 |

FOREIGN PATENT DOCUMENTS

| | | |
|---|---|---|
| DE | 33 30 059 A | 2/1985 |
| EP | 1 273 937 A | 1/2003 |

(Continued)

OTHER PUBLICATIONS

A. Frisch; European Search Report; Munich, Germany; Sep. 2, 2004.

(Continued)

*Primary Examiner*—K. Cyrus Kianni
(74) *Attorney, Agent, or Firm*—Amin, Turocy & Calvin, LLP

(57) ABSTRACT

The present invention provides systems and methods that employ a continuously variable optical delay line to introduce a delay into a transmitted optical signal. The delay line comprises a holey fiber configured in a spiral layout, wherein one end of the fiber is operative to a reflective fluid reservoir and the other end in operative to an input port. A segmented piezoelectric actuator is employed to position a reflective fluid within the fiber, utilizing a commutated technique that continuously moves the fluid. A signal received at the input port is routed through the holey fiber at an angle of incidence to achieve total internal reflection. The signal traverses towards the reflective fluid, and reflects back towards the input port after coming into contact with the fluid's surface. The delay introduced into the signal is a function of the distance traveled through the delay line.

5 Claims, 10 Drawing Sheets

FOREIGN PATENT DOCUMENTS

| | | | |
|---|---|---|---|
| JP | 09014911 A | 1/1997 | |
| JP | 2002311343 A | 10/2002 | |
| SU | 699654 A | 11/1979 | |
| WO | WO 9739315 A1 | 10/1997 | |

OTHER PUBLICATIONS

Patent Abstracts of Japan; vol. 2003, No. 02; Feb. 5, 2003 & Oct. 23, 2002; Fujitsu, Ltd.

Y. Jeong, et al.; Electrically Controllable Long-Period Liquid Crystal Fiber Gratings; IEEE Photonics Technology Letters; IEEE, Inc.; New York; vol. 12, No. 5; pp. 519-521; May 2000.

V.G. Chigrinov; Liquid Crystal Devices for Fiber Optical Applications; Proceedings of the SPIE; SPIE, Bellingham, Virginia, no date available.

P. Mach, et al.; Optical devices based on tunable scattering material in air-silica microstructured fiber; Quantum electronics and Laser Science Conference; Quels, 2001; Postconference. Technical Digest; Baltimore, Maryland; May 6-11, 2001; Trends in Optics and Photonics; Washington D.C.; vol. 57; pp. 167-168; May 6, 2001.

P. Mach, et al.; Tunable Microfluidic Optical Fiber; Applied Physics Letters; American Institute of Physics; New York; vol. 80, No. 23, pp. 4294-4296; Jun. 10, 2002.

C. Kerbage, et al.; Tunable devices based on dynamic positioning of micro-fluids in micro-structured optical fiber; Optics Communications, North-Holland Publishing Co.; Amsterday, NL; vol. 204, No. 1-6, pp. 179-184; Apr. 1, 2002.

Patent Abstracts of Japan; vol. 1997, No. 05; May 30, 1997; Fuji Photo Optical Co., Ltd; Jan. 17, 1997.

* cited by examiner

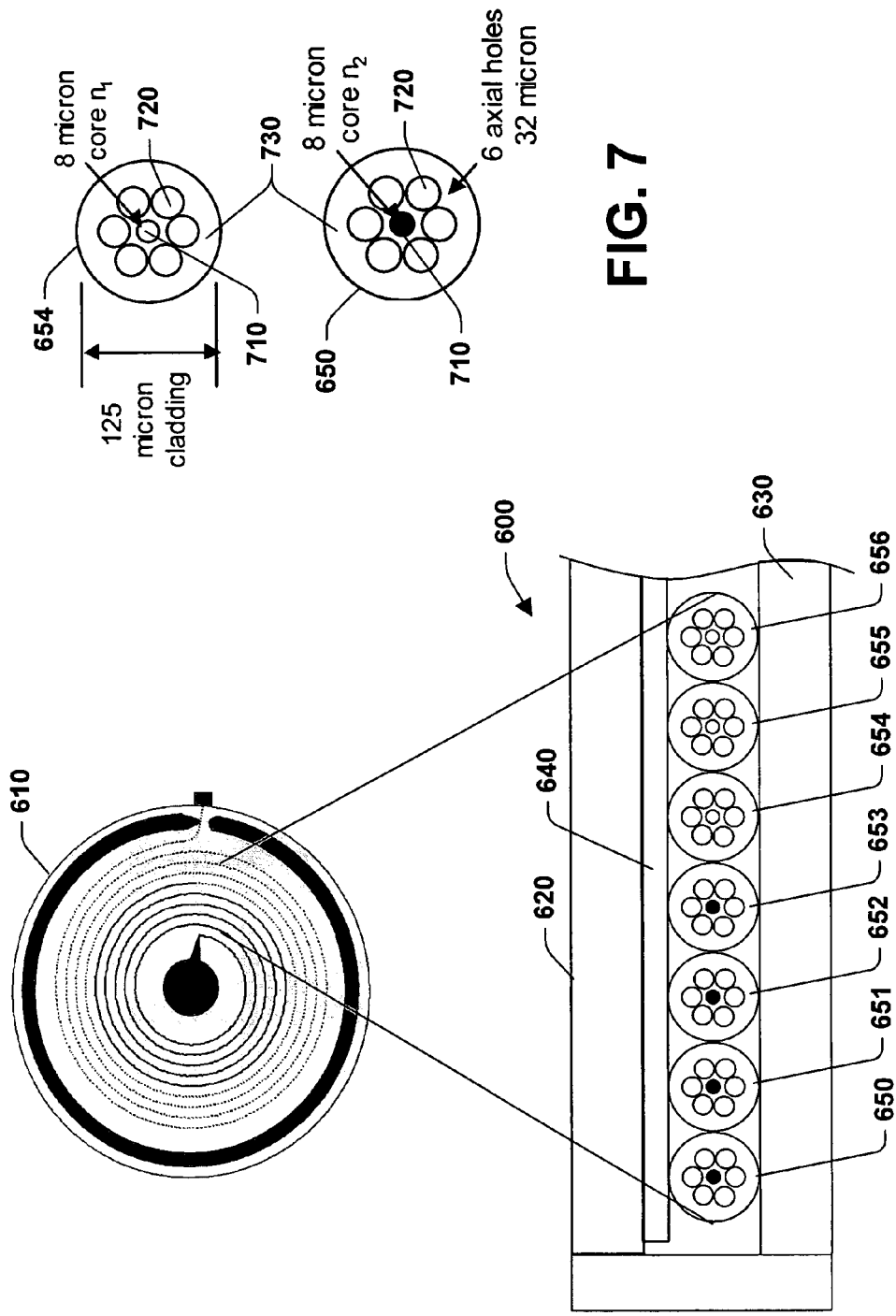

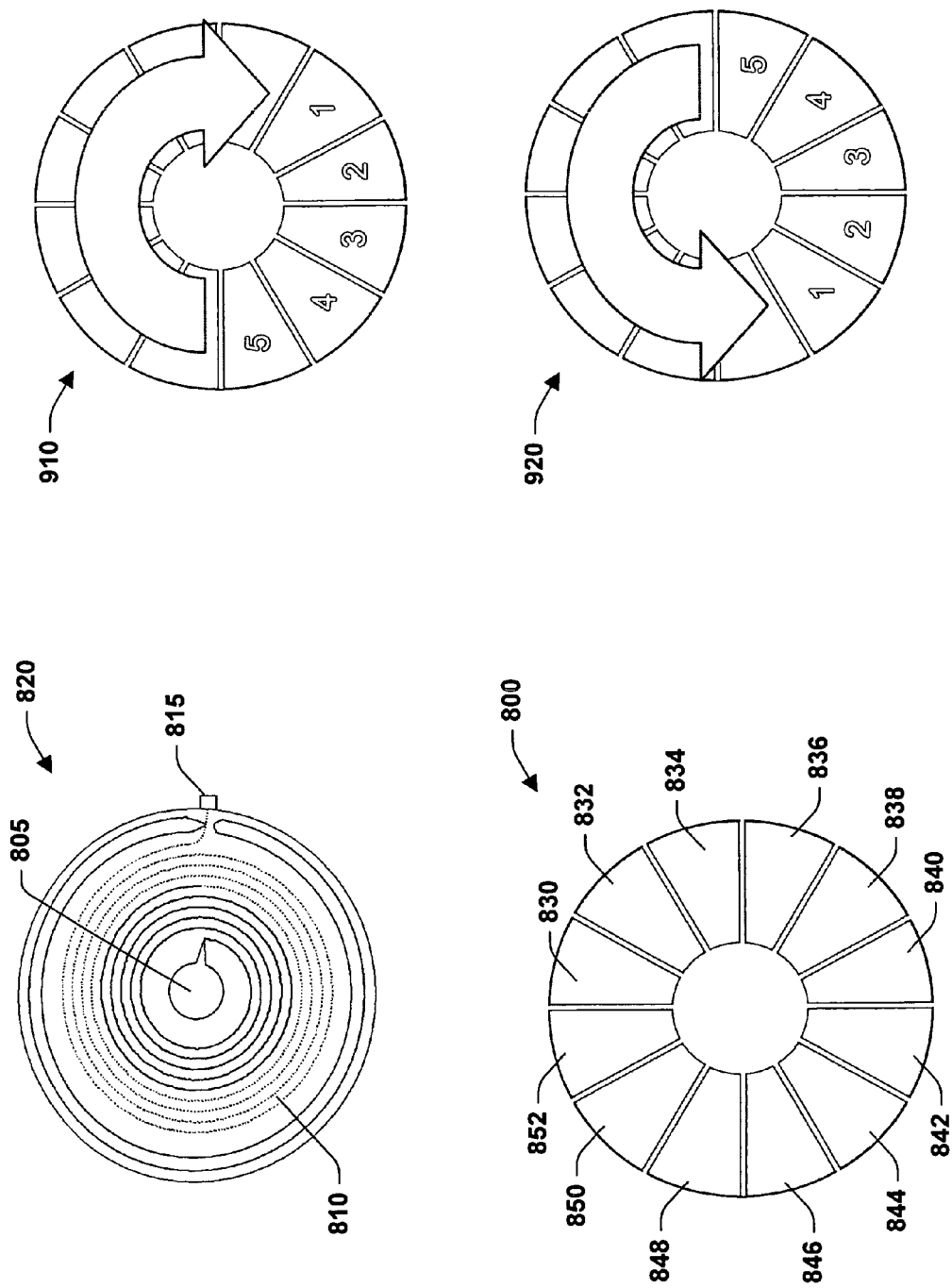

SYSTEMS AND METHODS FOR A CONTINUOUSLY VARIABLE OPTICAL DELAY LINE

CROSS-REFERENCE TO RELATED APPLICATIONS

This application is a divisional of U.S. patent application Ser. No. 10/636,007, filed Aug. 7, 2003 now U.S. Pat. No. 7,003,204 and entitled "SYSTEMS AND METHODS FOR A CONTINUOUSLY VARIABLE OPTICAL DELAY LINE", the entirety of which is incorporated herein by reference.

BACKGROUND OF THE INVENTION

1. Field of the Invention

The present invention relates to systems and methods for signal processing, and in particular for delaying a signal via a continuously variable optical delay line.

2. Discussion of the Related Art

The technical pursuit to provide transmission media with greater bandwidth and higher data rates to efficiently and reliably convey signals (e.g., video and/or audio) has lead to increased research and development in the fiber optics domain and the deployment of fiber optic channels, interfaces and associated devices. Since the invention of the telegraph, there has been a constant push to provide data at higher and higher rates. For example, RS-232 once was the standard employed to attach terminals. Then, technologies such as 10 Mbps Ethernet and 4/16 Mbps Token Ring were developed and replaced RS-232 as the standard. The next generation of transmission technologies included Fast Ethernet (100 Mbps) and Fiber Distributed Data Interface (100 Mbps FDDI), followed by Asynchronous Transfer Mode (155 Mbps ATM) and Fibre Channel (1062 Mbps). Recently, Gigabit Ethernet (1000 Mbps) has been introduced into the industrial and consumer market. With each successive increase in speed, the physical layer of the infrastructure is placed under more stress and more limitations. In fact, the cabling installed in many environments today cannot support the demands of Fast Ethernet let alone ATM, Fibre Channel or Gigabit Ethernet.

Fiber optics provides a viable alternative to the foregoing copper based solutions. Unlike its metallic counterpart (e.g., coaxial and twisted pair topologies), fiber optics does not have the astringent speed and distance limitations. For example, Ethernet run over coax (e.g., 10BASE2) has a maximum distance limitation of 185 m, and Ethernet run over twisted pair (e.g., 10BASE-T and 100BASE-TX) has a limitation of 100 m. In addition, Ethernet running at 10 Mbps has a limitation of 4 repeaters, providing some leniency in the solutions available for distance, however, Fast Ethernet only allows for two repeaters and only 5 m of cable between them. Fiber optics can greatly extend these distances with multimode fiber providing 2000 m and single-mode fiber supporting 5 km in half duplex environments, and much more (depending on transmitter strength and receiver sensitivity) in full duplex installations.

Furthermore, when using coaxial cable or twisted pair (shielded or unshielded) cable, electrical noise can be emitted by the cable, especially as connectors and ground connections age or weaken. Because fiber optics utilizes light pulses to send the signal, it is free of radiated noise, which renders it safe to install in sensitive environment. In addition, since there are no emissions to pick up and decode, it is not feasible to "tap" into it for the purposes of "eavesdropping," and thus optical fiber can provide security protection, which makes it a good candidate for secure network installations. Another problem that is common when using copper cabling is electrical noise from other products contaminating the desired electrical signal. This can be a problem in noisy environments such manufacturing environments, and in industrial and aerospace applications. In contrast, optical fiber provides a signal that is virtually unaffected by external noise.

A typical fiber optic cable comprises a core, a cladding, a coating, a strengthener, and a protective jacket. In general, the core is the center of the cable and is the medium of propagation for an optical signal. Cores can be made of glass (e.g., silica) and/or plastic, configured as hollow or solid, and with a high refractive index. Glass based cores provide longer distances and greater bandwidth, whereas plastic provides a more affordable cable that is easier to install and splice. Typical core sizes range from 8 microns for a single mode silica glass core up to 1000 microns for a multi mode POF. The cladding generally is a material of lower index of refraction and surrounds the core. This difference in index of refraction forms a mirror at the boundary of the core and cladding. Because of the lower index, it reflects the light back into the center of the core, forming an optical waveguide. It is this interaction of core and cladding that is the heart of optical fiber transmission. For example, for the core/cladding boundary to work as a mirror, the light needs to strike it at a small/shallow angle referred to as the angle of incidence, which typically is specified as the acceptance angle (or numerical aperture, which is the sine of the acceptance angle) and is the maximum angle at which light can be accepted by the core.

The protective coating is applied around the outside of the cladding. Such coatings generally comprise a thermoplastic material for tight buffer construction and a gel material for loose buffer construction. For a tight buffer construction, the buffer is extruded directly onto the fiber, tightly surrounding it. Loose buffer construction utilizes a gel filled tube, which is larger than the fiber itself. Loose buffer construction offers a high degree of isolation from external mechanical forces such as vibration, whereas tight buffer construction provides for a smaller bend radius, smaller overall diameter, and crush resistance. To further protect the fiber from stretching and to protect it from expansion and contraction due to temperature changes, strength members can be added to the cable construction. These members typically are made from various materials from steel to Kevlar. The jacket can be applied over the strength member to protect against the environment in which the cable is installed.

As fiber deployment increases, the economy of scale for the manufacturers is driving costs down. In addition, research and development efforts continue to further reduce costs. For example, POFs provides a cost-reducing alternative to glass. In another example, optical fiber can be employed with legacy equipment and infrastructures by utilizing copper-to-fiber media converters. Media converters are devices, typically small enough in size to fit in the palm of your hand and they convert input signals from one media type and to another media type. Thus, equipment with an AUI port can utilize optical fiber transceivers. For those instances when collision domain restrictions preclude the use of fiber, a 2-port bridging device (such as Transition Networks Pocket Switch) with 10/100-BASE-T(X) on one port and fiber on the other can be utilized.

As noted above, fiber optics technology has advanced to the stage to render it a viable alternative to copper solutions. However, fiber optics, as well as its copper counterpart, lag product and consumer demand. For example, many communications systems could be expanded in performance if a device were available that would provide wide bandwidth signal delay over a long adjusted duration. A high time-bandwidth product delay line can provide processing capabilities on narrowband signals in wide spectra. Current optical technology includes fixed optical delay lines formed by fibers with no adjustment in time delay, fibers that are physically stretched over a very small percentage of total delay and switched binary combinations with discrete (e.g., course) delay steps such as delays of equal to L+L/2+L/4+L/8+ . . . +L/N, where L is the fiber length and N is an integer multiple of two. Switched binary combinations can provide more than one delay; however, discrete delay steps render the fiber susceptible to photons loss when a switch event occurs. Thus, switching delays can be a source of unreliability, and fiber length cannot be referenced to a stable wavelength.

SUMMARY OF THE INVENTION

The present invention provides systems and methods that facilitate the manifestation of a true time delay in a transmitted signal via employing a continuously variable optical delay line in connection with the transmission of the signal. The systems and methods utilize a novel delay line that includes a hollow core holey fiber, a reflective fluid and a segmented piezoelectric device, wherein the piezoelectric device utilizes a commutated technique to position the reflective fluid in the holey fiber in a continuous, rather than a discrete, manner. The position of the reflective fluid within the fiber determines the effective length of the holey fiber, which is indicative of the delay that can be introduced to the signal.

The novel delay line of the present invention provides an improvement for communications processors through its extremely high and tunable time-bandwidth. For example, unlike switched binary combination techniques that employ discrete delay changes and that are susceptible to photon loss, the continuously variable delay line loses virtually no information when continuous delay changes are effected. In addition, and unlike switched binary combination techniques, the delay can be accurately referenced to the wavelength, thereby making a very stable and accurate delay possible (e.g., within ¼ of the optical carrier's wavelength).

In general, a delay is introduced into an optical signal via directing the signal through an input port operative to the holey fiber, wherein the signal propagates away from the input port until it becomes incident with a reflective fluid in the holey fiber. The signal reflects off the surface of the reflective fluid and travels back towards the input port, thereby doubling the effective time delay for the length of fiber. The delay introduced to the signal is a function of the traveled distance, and thus the position of the reflective fluid within the holey fiber determines the delay. Thus, the holey fiber can be employed as the transmission line for wideband true time delay.

The holey fiber has a hollow core that can guide a single mode optical carrier having wideband modulation. Low loss can be achieved via conveying the signal at a suitable angle incident to the core and utilizing a photonic crystal construction in the cladding for total internal reflection. The reflective fluid has a large index of refraction mismatch with respect to the air or vacuum within the core that provides the reflection. The reflective fluid can be positioned in the fiber with pressure, as noted above, and/or with temperature.

In one aspect of the present invention, a system is provided that comprises a component that can be configured to introduce a transmission delay into a transmission line to provide wideband, true time delay. The system can achieve low loss optical transmission via utilizing an optical fiber with cladding constructed with photonic crystal and employing total internal reflection. The delay provided by the component is configurable and is determined via a continuous (e.g., not discrete) approach, wherein a fluid with a large index of refraction mismatch with respect to an air core of the fiber is propagated (e.g., temperature and/or pressure) within the fiber to define the fiber's effective length with respect to an input port, which determines the path length that the signal can traverse.

For example, the fluid can be propagated to a location within the holey fiber that is indicative of a desired delay, and then an optical signal received at the input port can be propagated through the holey fiber. When the signal reaches the air/fluid interface, it is reflected back towards the input port. The delay provided via the foregoing technique is virtually the traveled distance, or two times the effective length of the fiber. Employing the holey fiber with the commutated segmented piezoelectric device to form the variable optical delay line within the processing component 110 provides a novel and unique approach to construct an extremely high and tunable time-bandwidth component that can provide improved communications and reduce cost. In addition, since the delay line is continuously variable (not discrete), virtually no information is lost when delay changes are effected, and the delay can be accurately referenced to the wavelength thereby making a very stable and accurate delay possible.

In another aspect of the present invention, a layered architecture is provided that can be employed to construct an optical delay line. The layered architecture comprises an optical delay line layer comprising a hollow core holey fiber, a reflective fluid reservoir and an input port. The optical delay layer is operative to a delay-adjusting layer that facilitates propagation of a reflective fluid from the reservoir through the holey fiber via temperature and/or pressure. By positioning the reflective fluid within the holey fiber in a continuous manner, the effective length of the holey fiber can be variably adjusted to set a delay that will be introduced to a received signal. The continuous nature of the change in delay mitigates loss of photons, which is indicative of techniques employing discrete changes, or delay steps. The input port provides for accepting the signal, and subsequently transmitting the delayed signal.

In yet another aspect of the present invention, an exemplary optical signal delay component is provided. The component comprises a first plate, a second plate, a holey fiber layer, an actuator plate, a retaining ring and an optical interface, wherein a typical construction entails sandwiching the holey fiber layer and the actuator plate within the first and second plates and the retaining ring, wherein the optical interface is operatively coupled to the holey fiber layer through a port in the retaining ring. In one example, the foregoing component can be formed inexpensively as a compact component of about 6.0 cm by 1.0 cm.

The holey fiber layer typically comprises a holey fiber, a delay reservoir, an overflow reservoir, and a port. The holey fiber can comprises an air core and typically is orientated in a spiral layout, wherein one end is operative to the delay reservoir and the other end is operative to the port and overflow reservoir. The delay reservoir typically includes optically reflective fluid that can be forced to various locations in the holey fiber to set the delay via pressure and/or temperature in a continuous manner. In one example, a segmented piezoelectric actuator employing a commutated technique is utilized to force the reflective fluid through the holey fiber. The overflow reservoir mitigates loss and contamination of the reflective fluid. A signal is provided to the holey fiber at an angle of incidence to achieve total internal reflection, which mitigates signal loss through transmission and refraction through the cladding. After being input into the holey fiber, the optical signal traverses the spiral towards the delay reservoir, and then is reflected back to the input by the surface of the reflective fluid.

In another aspect of the present invention, methodologies are illustrated that provide for a continuously variable delay line, in accordance with an aspect of the present invention. In addition, an exemplary environment employing the systems and methods of the present invention is depicted. The foregoing systems and methods provide for a novel inexpensive, compact and rugged solution that can improve communications via an extremely high and continuously tunable time-bandwidth, with virtually no information loss, that can be accurately referenced to a wavelength to achieve a very stable and accurate delay.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 6 illustrates a cross-sectional view of a continuously variable delay line, in accordance with an aspect of the present invention.

FIG. 7 illustrates an internal capillary structure of a holey fiber that can be employed in a continuously variable delay line, in accordance with an aspect of the present invention.

FIG. 8 illustrates an exemplary segmented piezoelectric pressure device that facilitates the propagation of reflective fluid flow in a holey fiber, in accordance with an aspect of the present invention.

FIG. 9 illustrates exemplary techniques to decrease and increase a delay provided by a continuously variable delay line, in accordance with an aspect of the present invention.

DETAILED DESCRIPTION OF INVENTION

Figure 1:
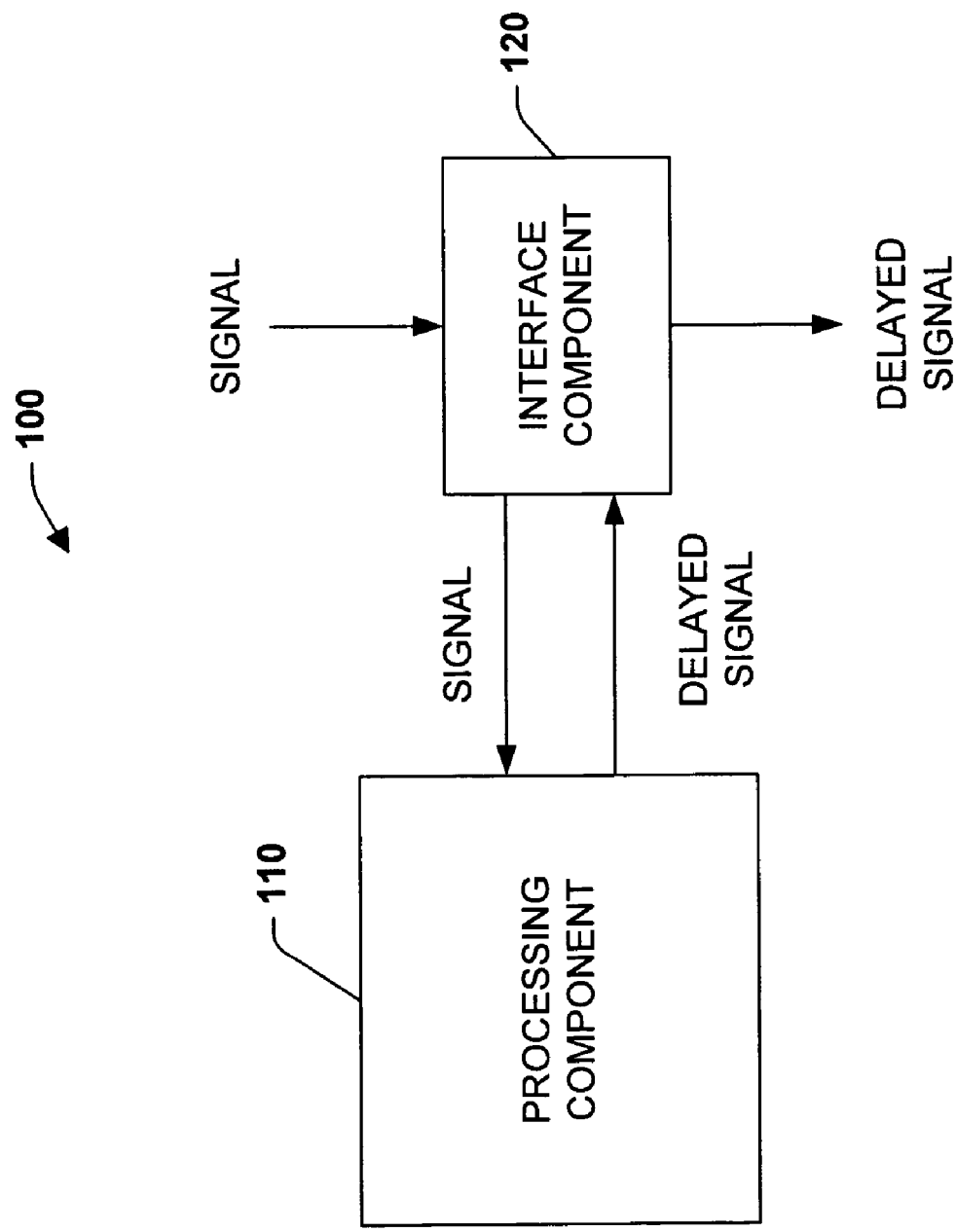
FIG. 1 illustrates an exemplary signal processing system that can introduce signal delays into signals that are routed through a processing component, in accordance with an aspect of the present invention.

The present invention provides systems and methods that employ a continuously variable optical delay line to introduce a delay in a transmitted optical signal. In many instances, such systems and methods can be utilized to increase a communication system's performance via providing a wide bandwidth signal delay over a long adjusted duration. By way of example, the systems and methods of the present invention can be employed to provide a high time-bandwidth product delay line that processes narrowband signals in wide spectra. Additional capabilities include true time delay beam forming with very long baselines that yield high accuracy angle of arrival detection and continuously variable programmable delay with high resolution and accuracy that provides repeatability and stability over long time periods and wide temperature ranges. In addition, the systems and methods of the present invention can be relatively inexpensive, compact in size, and rugged in construction.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

FIG. 1 illustrates an exemplary signal processing system 100, in accordance with an aspect of the present invention. The signal processing system 100 comprises a processing component 110 that can be configured to introduce a transmission delay and an interface component 120 that receives signals, routes signals to the processing component 110 and transmits delayed signals. The signal processing system 100 can be employed in connection with practically any transmission line (e.g., optical, and electrical and mechanical converted to optical) to provide wideband, true time delay.

The processing component 110 can employ various techniques to introduce optical delays. For example, in one aspect of the present invention, a fluid can be employed, wherein an optical signal, carrier (e.g., single and multi-mode) received from the interface component 120 can be propagated through a delay path, reflected off the fluid's surface and propagated back to the interface component 120, thereby doubling the effective time delay for the length of the transmission line. The fluid employed can have a large and/or small (depending on the desired characteristics) index of refraction mismatch with respect to the optical medium within the transmission line. In addition, the fluid can be variously positioned within the transmission line with temperature and/or pressure to affect the relative length of the delay line, or the distance between the fluid and the signal, and thus the delay. It is to be appreciated that various mediums can be employed within the transmission line in accordance with an aspect of the invention. For example, mediums such as air, vacuum and/or other fluids that are immiscible with the reflective fluid, for example, can be employed within the transmission line. Such flexibility provides for a functional dependent index of refraction. For example, an index of refraction with respect to a selected medium can provide for wavelength band-limiting.

In one aspect of the present invention, a piezoelectric device employing a commutated technique can be utilized to facilitate positioning the fluid within the transmission line to adjust the delay. Employing a holey fiber with the commutated segmented piezoelectric device to form a variable optical delay line within the processing component 110 provides a novel and unique approach to construct an extremely high and tunable time-bandwidth component that can provide improved communications and reduce cost. In addition, since the delay line is continuously variable (not discrete), virtually no information is lost when delay changes are effected, and the delay can be accurately referenced to the wavelength thereby making a very stable and accurate delay possible. For example, counting interference fringes between the input and the output carriers can provide very accurate delays and a stable monitor to within ¼ of the optical carrier's wavelength. A typical delay line can be configured for delays on the order of about 0 to about 10 microseconds in approximately two billion reproducible steps with signal bandwidths from about DC to about 50 GHz.

In contrast, conventional approaches typically utilize a fixed optical delay line formed by a fiber optic with no adjustment in time delay, physically stretched over a very small percentage of total delay, or a switched binary combination with discrete (e.g. Delay=L+L/2+L/4+L/8+etc.) changes. Although the switched binary combination can provide more than one delay, photons typically are lost in the fiber when a discrete delay step is invoked. In addition, the switches are inherently unreliable and lossey, line lengths cannot be referenced to a stable wavelength and step increments are relatively course.

In one aspect of the present invention, the signal processing system 100 can be coupled to an optical transmission channel, wherein any optical signal traversing the channel can be directed to the processing component 110. As depicted, the interface component 120 is employed to receive the optical signal and convey it to the processing component 110. However, it is to be appreciated that in other aspects of the present invention the processing component 110 can receive the optical signal directly from the transmission line or through another component(s). In addition, the interface component 120 can be configured to by-pass the processing component when a zero delay (e.g., no delay) is desired.

After receiving the optical signal, the processing component 110 can introduce a delay into the optical channel. As noted above, the processing component 110 can comprise at least a holey fiber, a commutated piezoelectric device and a reflective fluid, wherein the holey fiber's relative length can be adjusted via positioning the fluid within the fiber with the commuted piezoelectric device. The received signal traverses the holey fiber within the processing component 110 and reflects off the fluid's surface back to the interface component 120. The delay introduced into the channel is thus a function (e.g., about 2×) of the length of the holey fiber traveled by the optical signal.

The interface component 120 can then route the delayed optical signal back into the optical channel. It is noted that when the interface component 120 is not employed, the processing component can interface directly with the optical channel and/or with another component(s) to route the delayed signal to the optical channel. In addition, it is to be appreciated that the signal processing system 100 can be coupled to an RF system, and RF-to-optical and optical-to-RF converters can be employed to suitably convert signals for delay, transmission and reception. Furthermore, it is to be appreciated that more than one signal processing system 100 can be employed in connection with the transmission of a signal(s). For example, a single transmission path can include more than one signal processing system 100, wherein respective signal processing system 100 can be activated and deactivated. Such systems can provide for larger delays, and introduce delays at various steps in the transmission path. In another aspect, a plurality of single mode signals can be modulated, for example, within a single carrier, wherein a multiplexor can be used to separate respective signals so that respective delays can be introduced to the respective signals. After the signals are suitably delayed, a demultiplexor can be utilized to continue modulating the signals within the single carrier.

Figure 2:
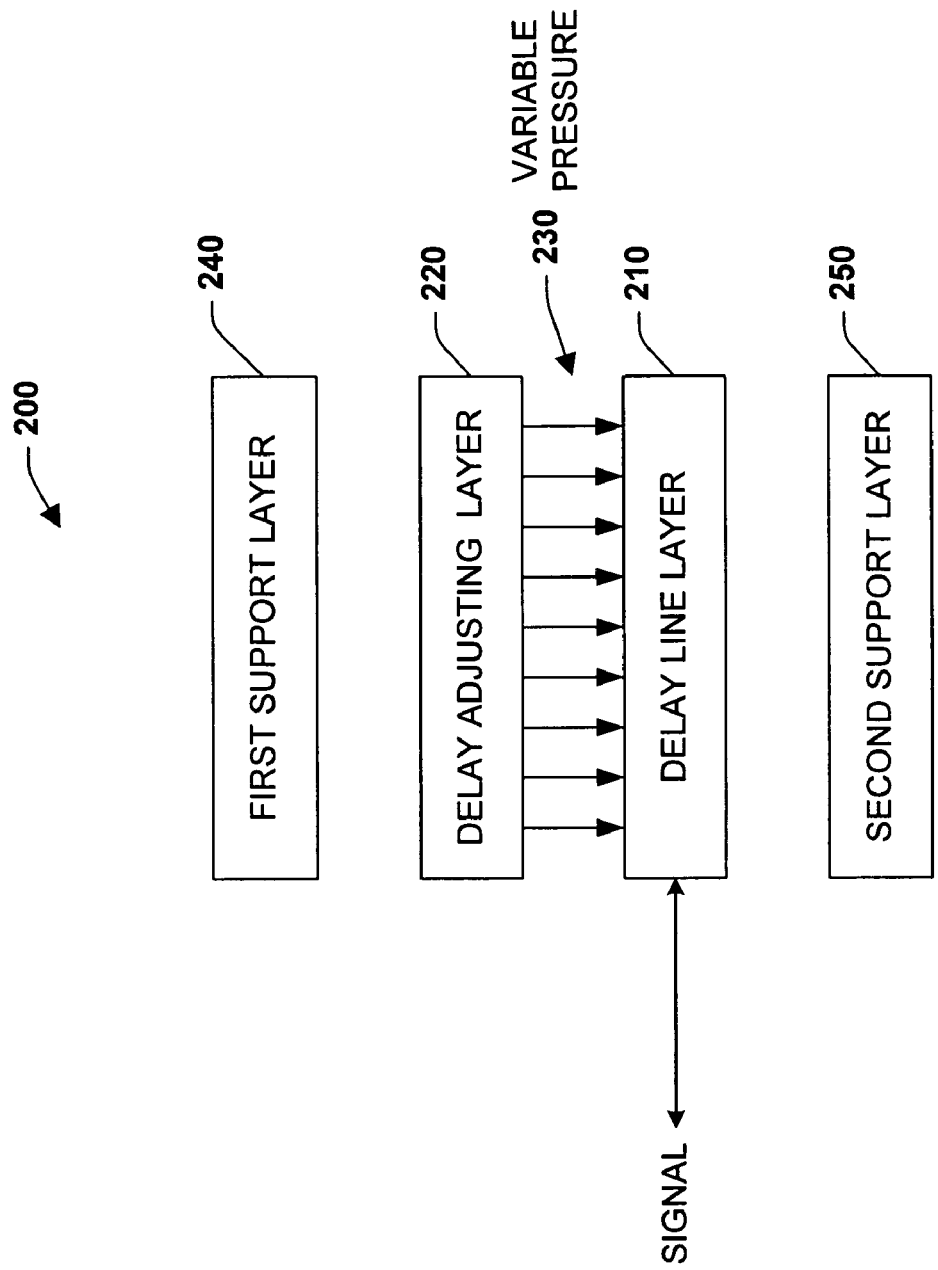
FIG. 2 illustrates an exemplary layered architecture that can be employed to construct a component that provides for delaying signals, in accordance with an aspect of the present invention.

FIG. 2 illustrates a layered architecture 200 that can be employed to construct a signal delay component (e.g., processing component 110), in accordance with an aspect of the present invention. The layered architecture 200 comprises an optical delay line layer 210 that receives a signal and returns a delayed signal. The optical delay line layer 210 can include a hollow core holey fiber that is operative to a reflective fluid reservoir (not shown) and an input port (not shown). The reflective fluid reservoir can be employed as a source of reflective fluid that is propagated through the holey fiber. By positioning the reflective fluid within the holey fiber, the effective length of the holey fiber can be adjusted to be a function of the length of the holey fiber from the input port to the reflective fluid. The input port provides an input for accepting, and subsequently transmitting, optical signals. As noted briefly above, the signal delay is determined by the distance from the input port to the reflective fluid, and is approximately equal to the two times such length.

A delay adjusting layer 220 can be employed in connection with the delay line layer 210 to facilitate forcing the reflective fluid through the holey fiber of the delay line layer 210. Typically, a pressure based technique is employed by the delay adjusting layer 220, which can exert a continuously variable pressure 230 to continuously vary the reflective fluid within the holey fiber, and thus the delay. For example, the delay adjusting layer 220 can be employed to continuously propagate the reflective fluid from the reflective fluid reservoir to a position in the direction of the input port to decrease the delay, or from its current position back towards the reflective fluid reservoir to increase the delay. The continuous change in delay mitigates loss of photons, which is indicative of techniques employing discrete changes, or delay steps.

It is to be appreciated that a temperature technique to position the reflective fluid can alternatively or additionally be employed. Temperature can be utilized to affect reflective fluid properties such as viscosity and thermal expansion, for example. In addition, a second delay adjusting layer (not shown) can be provided on a different portion of the delay line layer 210. The second delay adjusting layer can be utilized serially and/or concurrently with the delay adjusting layer 220. For example, the delay adjusting layer 220 and the second delay adjusting layer can be employed to provide pressure to a substantially similar portion of the holey fiber within the delay line layer 210. In another example, the delay adjusting layer 220 can be activated, and then the second delay adjusting layer can be activated time t later.

A first support layer 240 and a second support layer 250 can be employed to position the delay adjusting layer 220 operative to the delay line layer 210. In addition, the support layers 240, 250 can be utilized to maintain the positions such that when pressure is applied by the delay adjusting layer 220, the pressure is received by the delay line layer 210. It is to be appreciated that additional layers such as protective layers, strengthening layers and various other coatings and layers can be employed in accordance with an aspect of the present invention.

Figure 3:
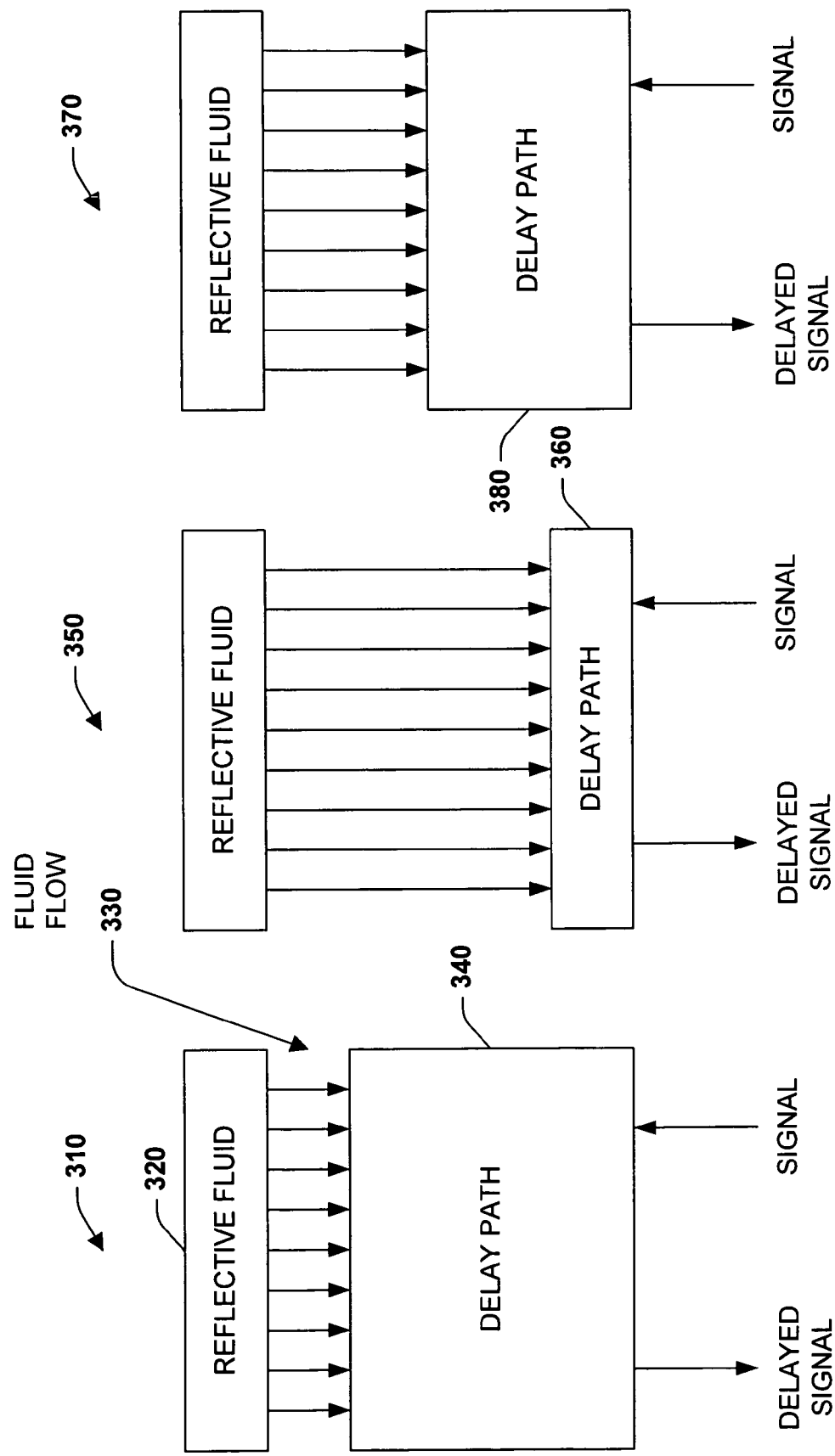
FIG. 3 depicts various exemplary holey fiber delay path lengths, which are based on the position of a reflective fluid within the holey fiber, in accordance with an aspect of the present invention.

FIG. 3 depicts various delays, or holey fiber delay path lengths based on the position of the reflective fluid, in accordance with an aspect of the present invention. At 310, a reflective fluid reservoir 320 is illustrated, wherein reflective fluid has been propagated towards 330 the input through a holey fiber to establish a delay path 340. The delay path 340, as depicted, receives optical signals and transmits delayed optical signals. After receiving an optical signal, the signal traverses the delay path 340, reflecting off the reflective fluid. As noted above, the delay is a function of the effective length of the delay path 340, which depends on the position of the reflective fluid within the holey fiber. At 350, the reflective fluid reservoir 320 is employed to propagate reflective fluid to different position within the holey fiber to create a delay path 360. At 370, the reflective fluid from the reflective fluid reservoir 320 is propagated to another position within the holey fiber to create a delay path 380. It is to be appreciated that the foregoing are for explanatory purposes and various other delay paths can be employed in accordance with an aspect of the present invention.

Figure 4:
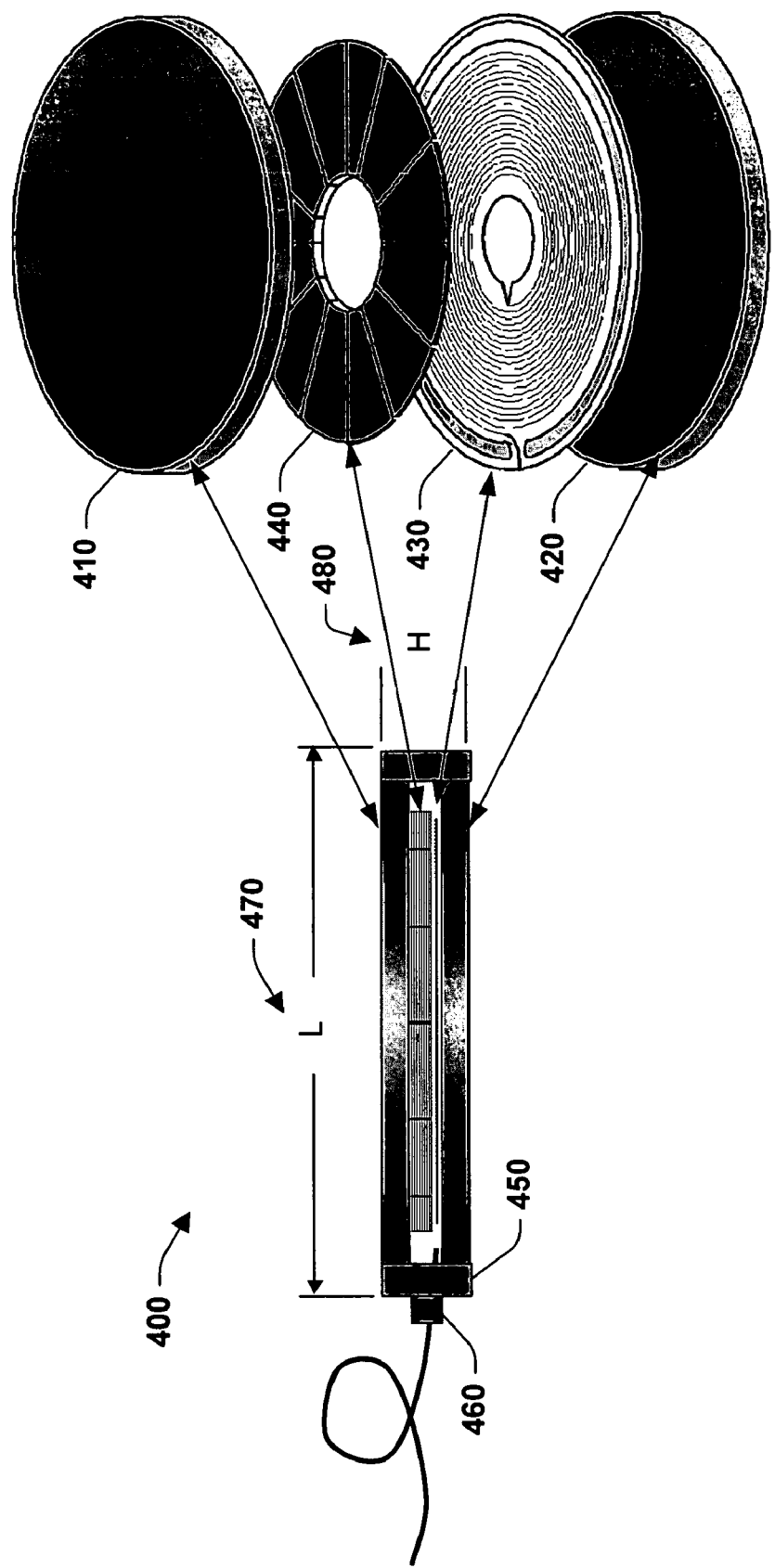
FIG. 4 illustrates an exemplary optical signal delay component, in accordance with an aspect of the present invention.

FIG. 4 illustrates an exemplary optical signal delay component ("component") 400, in accordance with an aspect of the present invention. The component 400 comprises a first plate 410, a second plate 420, a fiber layer 430, an actuator plate 440, a retaining ring 450, and an optical interface 460. A typical orientation is depicted, wherein the component 400 is constructed as a "sandwich" with the holey fiber layer 430 and actuator 440 encapsulated within the first and second plates 410, 420 and the retaining ring 450, and the optical interface 460 is operatively coupled to the holey fiber layer 430 through a port in the retaining ring 450. The component 400 can be constructed to a suitable length ("L") 470 and height ("H") 480 to render a compact and low cost continuously variable delay line component. For example, in one aspect of the present invention, the length of component 400 can be formed to about 6 cm and the height of the component 400 can be formed to about 1.0 cm. It is to be appreciated that the foregoing dimensions are provided for illustrative and not limitative purposes.

Figure 5:
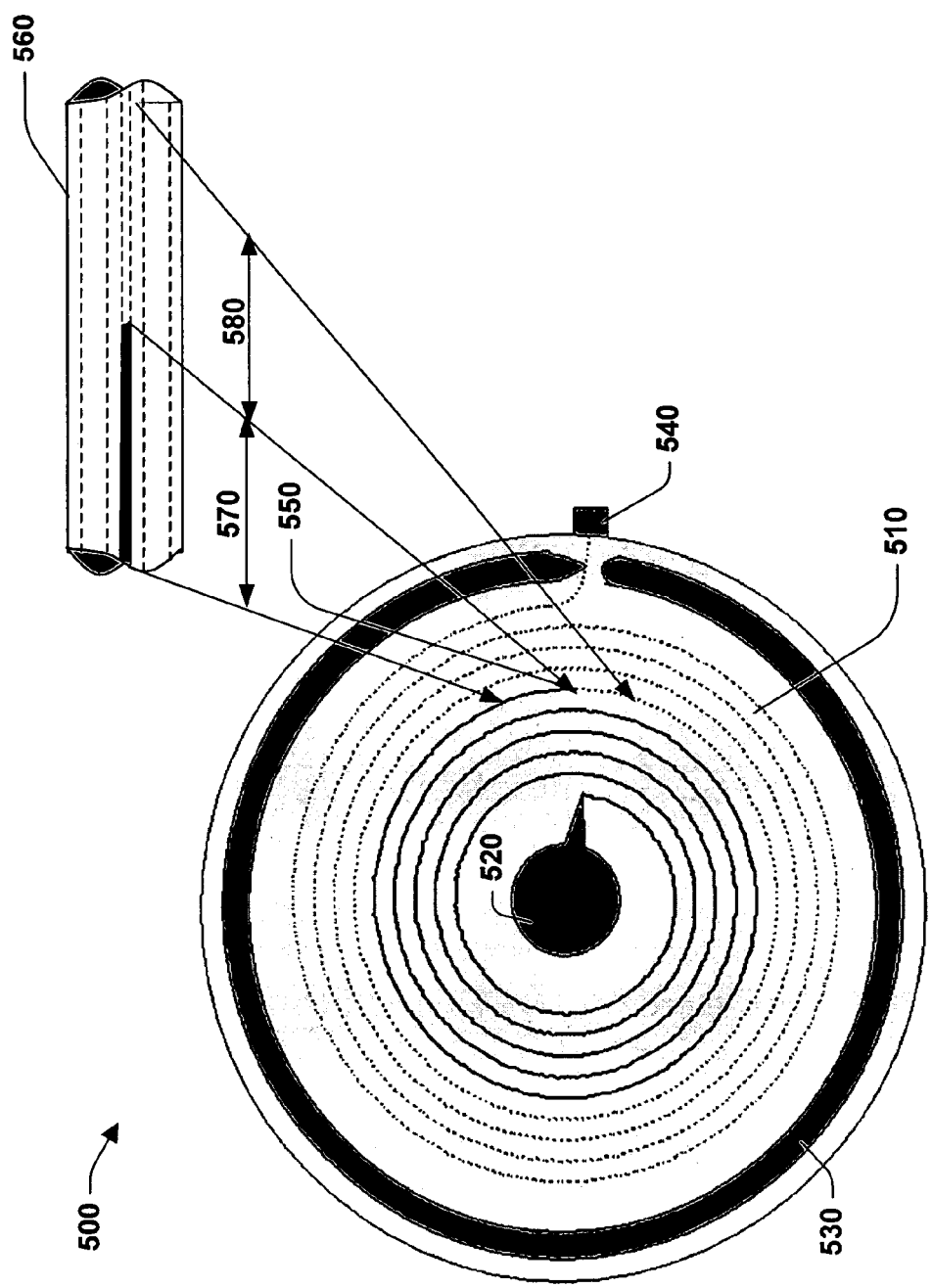
FIG. 5 illustrates an exemplary optical fiber layer, in accordance with an aspect of the present invention.

FIG. 5 illustrates an exemplary fiber layer 500, in accordance with an aspect of the present invention. The fiber layer 500 (e.g., fiber layer 430) comprises a holey fiber 510, a delay reservoir 520, an overflow reservoir 530, and a port 540. The holey fiber 510 is depicted in a spiral layout, wherein one end of the holey fiber 510 is operative to the delay reservoir 520 and the other end is operative to the port 540 and the overflow reservoir 530. It is to be appreciated that the holey fiber 510 comprises a hollow, or air core path with a large index of refraction mismatch with respect to an associated cladding (e.g., with photonic crystal construction) and a reflective fluid for low loss total internal reflection of optical signals.

The delay reservoir 520 typically includes optically reflective fluid that can be forced to various locations in the spiral, or holey fiber 510 via pressure (e.g., via the actuator 540) and/or temperature. As noted previously, the reflective fluid is employed to vary the effective length of the holey fiber 510, thereby determining the delay. One advantage of the present invention is that the reflective fluid can be propagated through the spiral holey fiber 510 in a continuous manner, which improves signal integrity and delay dynamic range. Conventional systems typically employ switched binary combinations to provide more than one delay. Such conventional systems are susceptible to photon loss, unreliability and lower dynamic range, and cannot be referenced to a stable wavelength with accuracy.

Theoretically, the maximum delay occurs when substantially all of the reflective fluid resides in the delay reservoir 520, at which point the delay is essentially two times the length of the holey fiber 510. The theoretical minimum occurs when the reflective fluid in the delay reservoir 520 is dispersed throughout the length of the holey fiber 510, wherein substantially no delay is introduced. As depicted, the reflective fluid has been propagated through holey fiber 510 to reference point 550. A holey fiber portion 560 illustrates a longitudinal section of the holey fiber 510, wherein reflective fluid has been propagated through a first portion of the core 570, while a second portion of the core 580 remains virtually free of reflective fluid.

The optical signal is input at the end of the holey fiber 510 that is threaded through the port 540. The optical signal is provided to the holey fiber 510 at a suitable incident angle to achieve total internal reflection and mitigate signal loss through transmission and refraction through the cladding. After being input into the holey fiber 510, the optical signal traverses the spiral towards the delay reservoir 520. When the optical signal contacts the reflective fluid at 550, the optical signal reflects off the reflective fluid's surface and travels back toward the port 540. The delayed optical signal can then exit out of the holey fiber 510 through the port 540.

As noted above, one end of the holey fiber 510 is operative to the delay reservoir 520 and the other is operative to the port 540 and the overflow reservoir 530. Employing the overflow reservoir 530 mitigates reflective fluid loss and contamination thereof via proving a holding tank for unintended reflective fluid overflow and a closed system, respectively.

FIG. 6 illustrates a cross-sectional view 600 of a continuously variable delay line 610, in accordance with an aspect of the present invention. The view illustrates a portion of a first plate 620, a portion of a second plate 630, a pressure plate 640, and a plurality of holey fiber cross-sections 650-656. As depicted, the plurality of holey fiber cross-sections 650-653 include hollow cores filled with reflective fluid and the plurality of holey fiber cross-sections 654-656 include hollow cores without reflective fluid.

FIG. 7 illustrates one example of suitable dimensions associated with the continuously variable delay line 600. Depicted are holey fiber cross-section 650 with reflective fluid and holey fiber cross-section 654 without reflective fluid. Both holey fiber cross-sections 650, 654 comprise a capillary structure with a hollow core 710, a plurality of holes 720 and a cladding 730. In one aspect of the present invention, the core 710 diameter is about 8 microns, the holes 720 diameter is about 32 microns and the cladding 730 diameter is about 125 microns, wherein the foregoing diameters can be inner or outer diameters. As known, the international standard for the outer cladding diameter is about 125 microns, the standard core size for a single-mode fiber with a small core size if about 8 to 10 microns, and the standard core size for a multi-mode fiber is about 50 microns and 62.5 microns. Standard cladding and core diameter sizes can facilitate compatibility among connectors, splices and tools. It is to be appreciated that various other diameter sizes for the cladding, core and/or holes can be employed in accordance with the present invention. In addition, although the holey fiber cross-sections are depicted with six holes, it is to be appreciated that the number of holes can vary depending on the desired characteristics.

FIG. 8 illustrates an exemplary pressure device 800 that can be employed within an optical transmission delay component to facilitate movement of a reflective fluid from a delay reservoir 805 through a holey fiber 810 towards an optical input 815 of an optical fiber layer 820 to configure the component to provide a desired delay. In general, the pressure device 800 resides proximate the optical fiber layer 820 as illustrated in connection with systems 400; however it is to be appreciated that one or more layers can be located between the pressure device 800 and the optical fiber layer 820, and/or more than one pressure device can be utilized, including multiple pressure devices on the same side and/or at least one other pressure device on the opposing side of the optical fiber layer 820.

The pressure device 800 can comprise a plurality of segmented piezoelectric actuators 830-852, wherein the actuators 830-852 are activated via a commutated technique such as sequentially in a clockwise or counter clockwise direction, for example. When the actuators are inactive, as depicted at 800, the reflective fluid maintains its location and the existing delay, if any, is not affected. It is noted that the delay reservoir 805, holey fiber 810, optical input 815 and optical fiber layer 820 illustrated can be substantially similar to those described herein.

FIG. 9 illustrates techniques to decrease or increase the delay provided by the optical fiber layer 820. At 910, the optical delay is decreased by activating the actuators in a direction that migrates the reflective fluid from the delay reservoir 805 to the optical input port 815. As depicted, the actuators are stimulated in a clockwise direction, which corresponds to an outward radial migration of the reflective fluid within holey fiber 810. As described previously, moving the reflective fluid towards the optical input shortens the effective length of the optical delay line, which decreases the delay introduced into the optical signal path.

At 920, the optical delay provided by holey fiber 810 is increased. The optical delay is effected by activating the actuators in a direction that migrates the reflective fluid towards the delay reservoir 805. As depicted, the actuators are stimulated in a counter-clockwise direction which corresponds to an inward radial migration of the reflective fluid which increases the effective length of the optical delay line, thereby increasing the delay introduced into the optical signal path.

Figure 10:
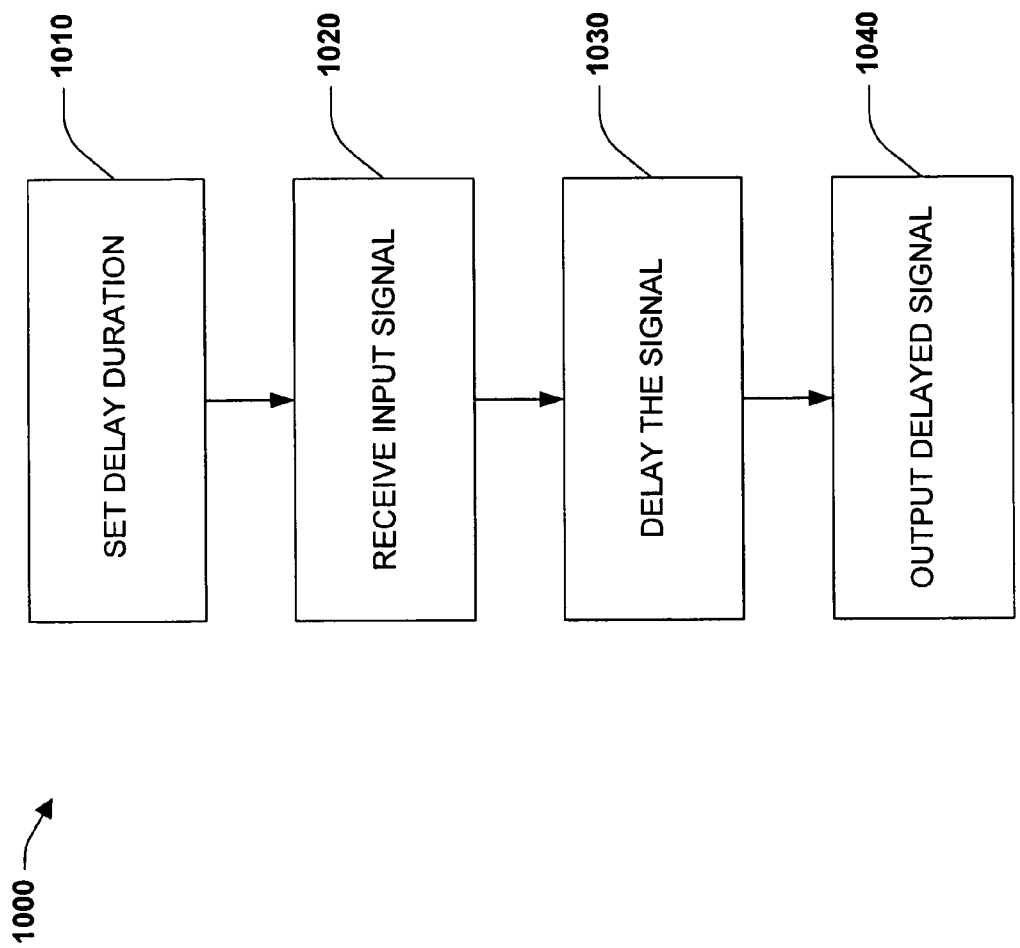
FIG. 10 illustrates an exemplary methodology to introduce a signal delay, in accordance with an aspect of the present invention.

FIG. 10 illustrates a methodology in accordance with an aspect of the present invention. While, for purposes of simplicity of explanation, the methodologies may be shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to FIG. 10, a method 1000 to construct a continuously variable delay line, in accordance with an aspect of the present invention, is illustrated. At 1010, the delay of the continuously variable delay line is configured. As noted above, a continuously variable delay line comprises a delay component operative to a segmented pressure component, wherein the delay component and the segmented pressure component are enclosed via protection plates and a retaining ring. Additionally, an optical interface port is included that provides access to the delay component through the retaining ring. The delay component typically comprises a holey fiber (e.g., single-mode hollow core) operative to a reflective fluid reservoir and an overflow reservoir, and, as noted above, a means to exit the delay line through the retaining ring.

The delay is set by activating the segmented pressure component to continuously (e.g., without having to employ discrete shifts) force the reflective fluid from the reservoir towards the optical interface port to a location indicative of the desired delay. As noted previously, the effective length of the holey fiber, which is the length from the optical input port to the reflective fluid, determines the delay. It is to be appreciated that temperature can alternatively or additionally be utilized to propagate the reflective fluid. Propagating the reflective fluid in a continuous manner can improve signal quality via mitigating loss of photons that typically occurs when a discrete stepping technique is employed to set the delay. For example, switched binary combinations utilize courser discrete steps and are susceptible to photon loss, which renders them less reliable.

At 1020, an optical signal is received. The optical signal can be single or multi-mode. A single mode signal comprises a single ray of light, or signal as a carrier of information. Single mode carriers typically are utilized to convey data long distances. Multimode signals comprise more than one ray of light, or signal, wherein respective signals are transmitted with different reflection angles with respect to the optical fiber. Multimode carriers typically are utilized to convey data short distances because the signals tend to disperse over longer lengths.

At reference numeral 1030, the received signal is routed through the holey fiber, towards the reflective fluid. The optical signal typically is propagated through the holey fiber at an angle of incidence (e.g., acceptance angle or numerical aperture, which is the sine of the acceptance angle) to the core of the holey fiber such that total internal reflection can occur. Conveying the optical signal at such an angle provides for low loss optical transmission. Once incident to the reflective fluid surface, the optical signal is reflected back towards the optical interface port. At 1040, the delay optical signal can be introduced back into the optical transmission line. The delay introduced is essentially two times the path from the optical input interface to the reflective fluid surface, which corresponds to the distance traveled by the optical signal.

Figure 11:
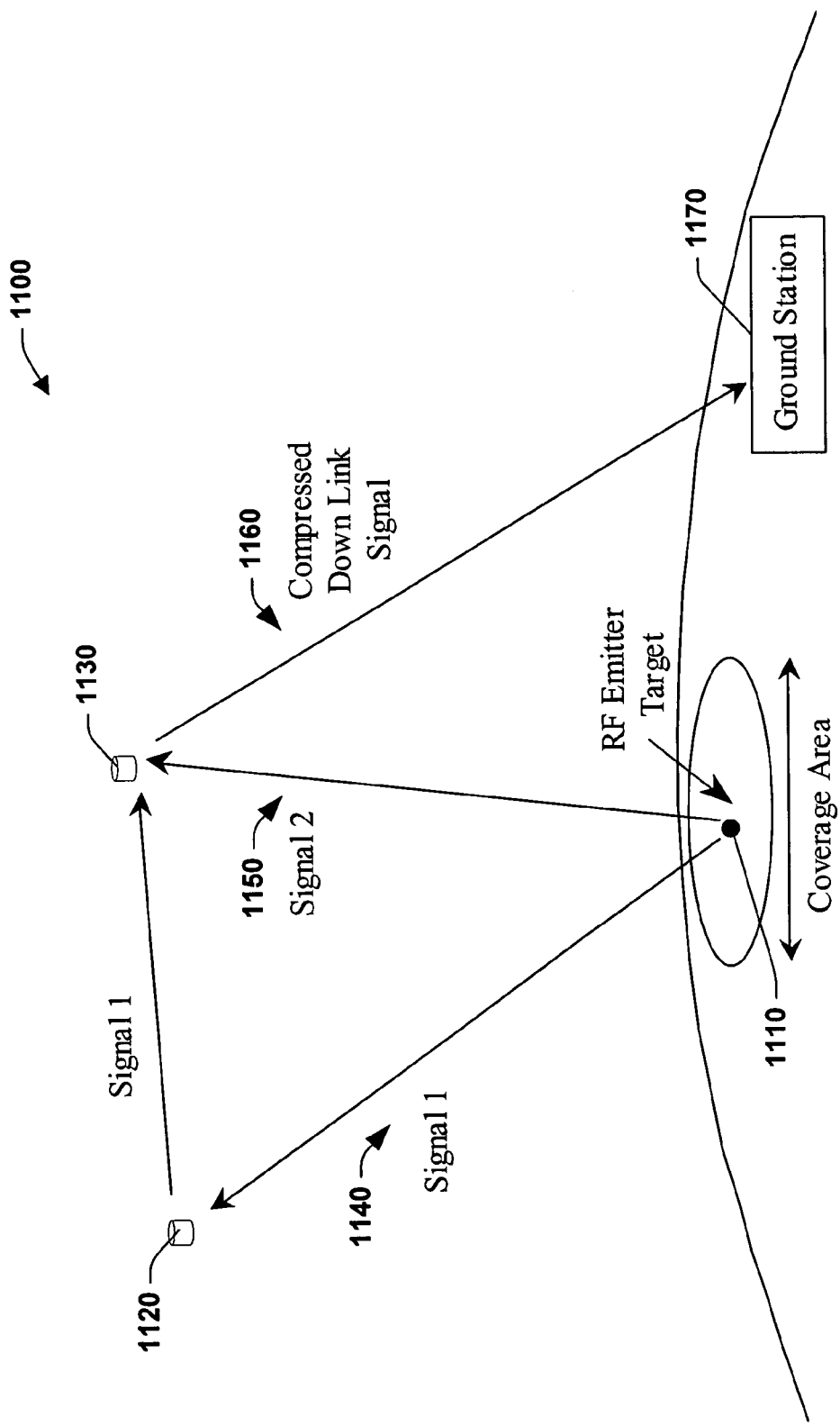
FIG. 11 illustrates an environment that can employ the novel aspects of the present invention.

FIG. 11 illustrates an environment 1100 that can employ the novel aspects of the present invention. The environment 1100 comprises a transmitter 1110 that can be employed as an RF emitter target within a coverage area. The environment 1100 further comprises a first receiver 1120 and a second receiver 1130 to accept the signals provided by the RF emitter target.

As depicted, a first signal ("signal 1") 1140 is transmitted to the first receiver 1120. After arriving at the first receiver 1120, signal 1 1140 is transmitted to the second receiver 1150. It is to be appreciated that signal 1 1140 can be processed prior to being transmitted to the second receiver 1150. In the example, the path of the signal 1 1140 is longer than the path of a second signal ("signal 2") 1150, which is serially and/or concurrently transmitted from the transmitter 1110 to the second receiver 1130. In applications wherein it is desirable for either the signals to arrive at the second receiver 1150 at substantially the same time or a variation of the signals (including a combination thereof) to arrive at a ground station at a substantially similar time, the continuously variable delay line described herein can be employed to delay signal 2 1150.

In one aspect of the present invention, the continuously variable delay line can be employed at the transmitter 1110 and can be suitably configure, for example, to satisfy the following: signal 1(*t*)+signal 2(*t*+τ)=2×signal 2 (*t*), wherein t is time (e.g., expressed in second, minutes, hours, etc.) and τ is a delay. In another aspect of the present invention, the continuously variable delay line can be alternatively or additionally employed at the first receiver 1120 and/or the second receiver 1130.

When employing the continuously variable delay line at the transmitter 1110, an RF signal can be converted to an optical signal or an optical signal can be generated from an optical transmitter. In general, optical transmitters can be delineated into two groups—light emitting diodes (LEDs) and lasers. LEDs are more commonly employed in shorter distance applications and are lower in cost and provide efficient solutions. When high power is required for extended distances, lasers are typically utilized. Lasers provide coherent light and the ability to produce a lot of light energy. Power typically is expressed in terms of dBm, wherein multiple mode transmitters commonly employ signals with power about-15 dBm and single mode transmitters employ a wide power range, depending on the application.

Optical transmitter types can also be broken down into multiple mode and single mode transmitters. Multimode transmitters generally are utilized with larger cable (e.g., 62.5/125 microns) and emit multiple rays or "modes" of light into the fiber. Respective rays enter the fiber at different angles and, as such, have a slightly different path through the cable. This results in the light reaching the receiver at slightly different times. This difference in arrival times is termed modal dispersion and causes signal degradation. Single mode transmitters are utilized with very small cable (e.g., 8/125 microns) and emit light in a single ray. Because there is only one mode, the light arrives at the receiver at the same time, eliminating modal dispersion.

After transmission, the optical signal can be received by an optical receiver. In general, the optical receivers are suitably selected to efficiently receive via considering the transmitted optical signal wavelength and mode. As known, matching signal wavelength and mode provides for maximum power transfer. Receiver sensitivity is also considered. Sensitivity is the counterpart to power for transmitters, and is a measurement of how much light is required to accurately detect and decode the data in light stream. Conventionally, and similar to power, sensitivity is expressed in dBm as a negative number, wherein the smaller the number (the more negative the number) the better the receiver. Typical values range from −30 dBm to −40 dBm.

The receiver sensitivity and the transmitter power commonly are employed to calculate the optical power budget available, which can be expressed as: Power Budget =Transmitter Power−Receiver Sensitivity. For example, the power budget for a typical multi-mode application would be: 15 dBm=−15 dBm−(−30 dBm). The optical power budget should be greater than all of the losses such as attenuation, losses due to splices and connectors, etc. Suitable connector styles include SC connectors (recently standardized by ANSI TIA/EIA-568A), ST connectors, and MIC (duplex) connectors. MIC Connectors are physically larger then SC connectors, and are more commonly employed with FDDI.

The optical signal can then be routed through the continuously variable delay line, wherein the signal can be suitable delayed, as described above. Then, depending on the transmission, the delayed optical signal can be transmitted or the signal can be converted to an RF signal and transmitted. It is to be appreciated that techniques similar to the foregoing can be employed at the first and second receivers 1120, 1130. For example, the receivers 1120, 1130 can receive an RF signal, convert the signal to an optical signal, route the optical signal to a continuously variable delay line, convert the delayed optical signal to an RF signal, and transmit the RF signal. In another, the receivers 1120, 1130 can receive an optical signal, wherein the converters are not employed.

Figure 12:
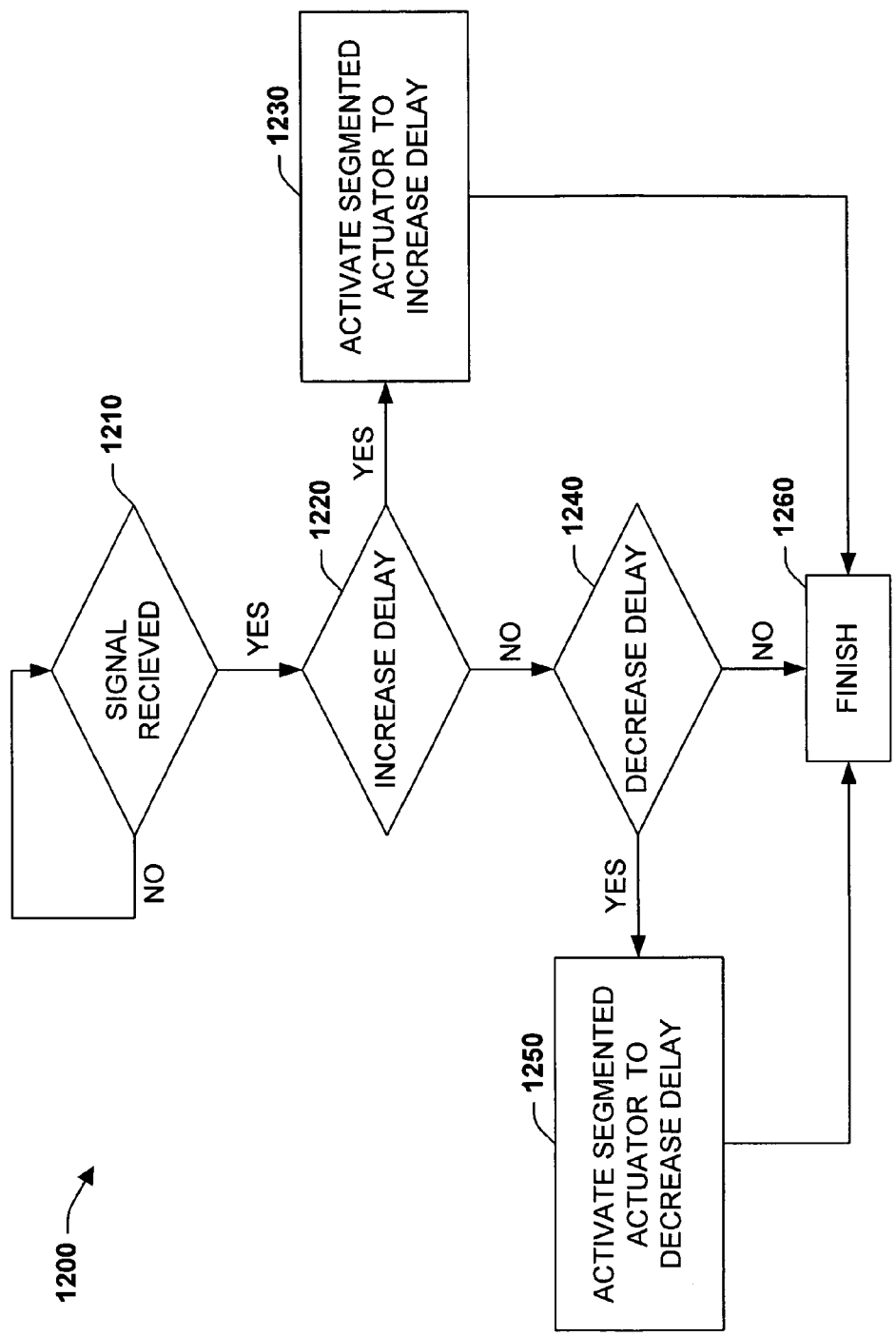
FIG. 12 depicts an exemplary flow diagram for introducing a delay with a continuously variable delay line, in accordance with an aspect of the present invention.

FIG. 12 illustrates a flow diagram for introducing a delay with a continuously variable delay line, in accordance with an aspect of the present invention. While, for purposes of simplicity of explanation, the methodologies may be shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to reference numeral 1210, the system waits for a signal to arrive. Various techniques can be employed to detect a signal. For example, and as depicted, a polling technique can be employed, wherein the system periodically checks a buffer or register to determine whether a signal or information indicative of a signal has arrived. In another aspect to the present invention, the system can maintain an idle state until a request or other signal activates and notifies the system that a signal has or is about to arrive. In other aspects of the present invention, additional components can be employed which triage incoming signals and alert the system that a signal has arrived.

At 1220, a determination is rendered as to whether the current configuration of the continuously variable delay line is suitable for the received signal or whether the delay should be increased. If it is determined that the delay should be increased, then at 1230 a segmented actuating device is configured to increase the delay. Configuration can be automatic and/or manual. Automatic techniques can employ intelligence (e.g., artificial intelligence, or AI) to render decisions based on historical events, statistics, pre-stored parameters and generated values, for example. In addition, the intelligence can interact with a human or robot to obtain additional information.

Manual techniques can include interaction with an interface, such as a user interface (UI), graphical user interface (GUI) or command line interface. The UI and/or GUI can be employed to present questions and information, and obtain information from the user. For example, the GUI can comprise known text and/or graphic presenting regions comprising dialogue boxes, static controls, drop-down-menus, list boxes, pop-up menus, and graphic boxes. The presenting regions can further include utilities to facilitate the presentation. For example, the presenting regions can include vertical and/or horizontal scroll bars to facilitate navigation through the foregoing and toolbar buttons to determine whether a region will be viewable. The user can interact with the presenting regions to select and provide information via various devices such as a mouse, a roller ball, a keypad, a keyboard, a pen and/or voice activation, for example.

Input regions utilized to obtain information can employ similar mechanism (e.g., dialogue boxes, etc.), and in addition provide utilities such as edit controls, combo boxes, radio buttons, check boxes, and push buttons, wherein the user can use the various input devices (e.g., the mouse, the roller ball, the keypad, the keyboard, the pen and/or voice activation) in connection with the mechanism and utilities. For example, the user can provide a location (e.g., the path) within a storage medium(s) via entering the path into an edit control and/or highlighting a check box associated with a valid path. Typically, a mechanism such as a push button is employed subsequent entering the information in order to initiate conveyance of the information. However, it is to be appreciated that the invention is not so limited. For example, merely highlighting the check box can initiate information conveyance.

The command line interface can also be employed to present to and obtain information from the user. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

After delay line configuration, the segmented actuating device can be activated to change the delay. As described herein, the continuously variable delay line typically comprises a holey fiber component proximate to the segmented actuating device. The segmented actuating device can be utilized to propagate a reflective fluid from a fluid reservoir through a holey fiber to set an effective holey fiber length that corresponds to the desired delay. In the subject example, it was determined at 1220 that the delay should be increased, or that the reflective fluid position should be moved from its current location to a location closer to the reflective fluid reservoir.

If at 1220, it is determined that the delay should not be increased, then at 1240 a determination is rendered as to whether the delay should be decreased. If it is determined that the delay should be decreased, then at 1250 the segmented actuating device is configured to decrease the delay. Similar to configuring the segmented actuating device to increase the delay, an automatic and/or manual technique can be employed. The segmented actuating device can then be activated to move the reflective fluid within the holey fiber to set the desired delay.

If at 1240, it is determined that the current delay can be employed (e.g., the delay should not be increased or decreased), then the segmented actuating device is not activated. After the delay is suitably set via increasing the delay at 1230, decreasing the delay at 1250 or maintaining the delay at 1240, then at 1260, the received signal can be routed through the holey fiber of the continuously variable delay line. As noted above, the signal traverses the holey fiber and reflects off the fluid's surface back to the input, wherein the delay introduced corresponds to the length of the holey fiber traveled by the optical signal. The delayed signal can then be routed for further processing, routing or transmission.

As used in this application, the terms "component" and "system" are intended to refer to a signal processing/communications related entity, either hardware, a combination of hardware and software, software, or software in execution. For example, a component and system can be, but are not limited to being, an integrated circuit integral to a signal processor, a signal processor, an interconnection, a client/host, modulator, a thread of execution, a program, and/or a computer. By way of illustration, both the signal-processing algorithm running on a signal processing chip and the signal-processing chip can be a component. Additionally, one or more components may reside within a process and/or thread of execution and a component may be localized on one computer and/or distributed between two or more computers.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A signal delay system, comprising:
   means for defining a delay to introduce into a received optical signal wherein a reflective fluid with a large index of refraction mismatch with respect to the core of a hollow core fiber is propagated within the fiber to define a path length that the signal can traverse; and
   means for routing the optical signal through the holey fiber to introduce delay into the signal.

2. The system of claim 1, further comprising means for continuously propagating the reflective fluid through the holey fiber to a desired location to increase or decrease the delay.

3. The system of claim 2, the means for propagating the reflective fluid employs temperature technique to position the reflective fluid at the desired location, the desired location is indicative of the delay introduced into the received optical signal.

4. The system of claim 2, the means for propagating the reflective fluid employs a pressure technique to position the reflective fluid at the desired location, wherein the means for propagating can be sequentially activated in a clockwise or anticlockwise direction to decrease or increase the delay respectively.

5. The system of claim 1, the signal is routed at an angle of incidence to achieve total internal reflection to provide for a low loss system.

* * * * *